June 27, 1933.  H. W. BODENDIECK  1,915,715
STAGING FOR LINEMEN
Filed Oct. 15, 1929  4 Sheets-Sheet 2
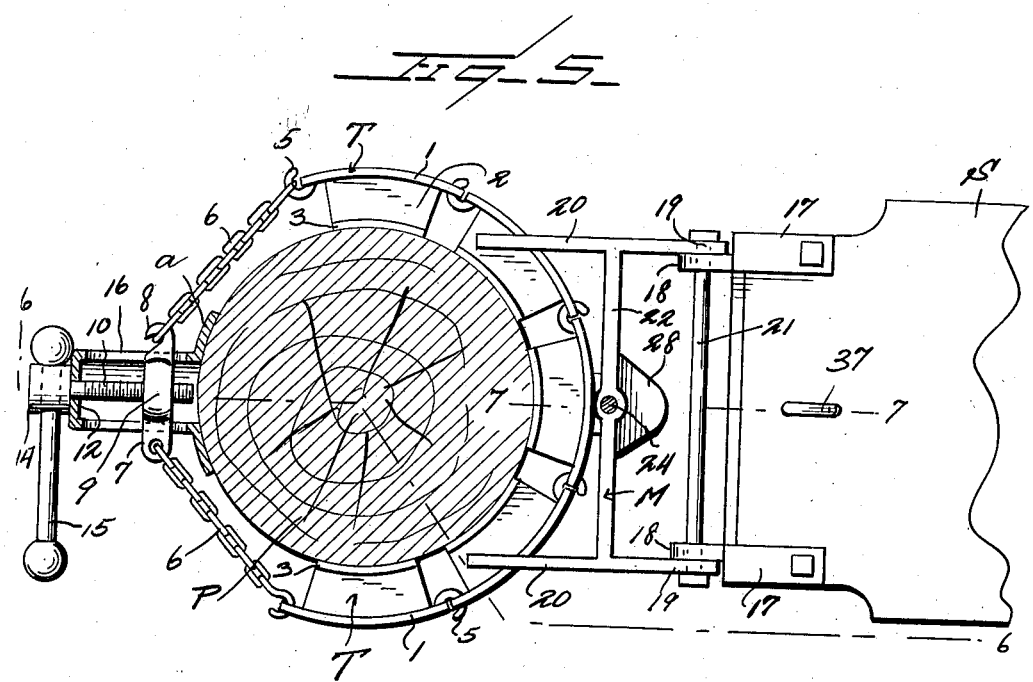
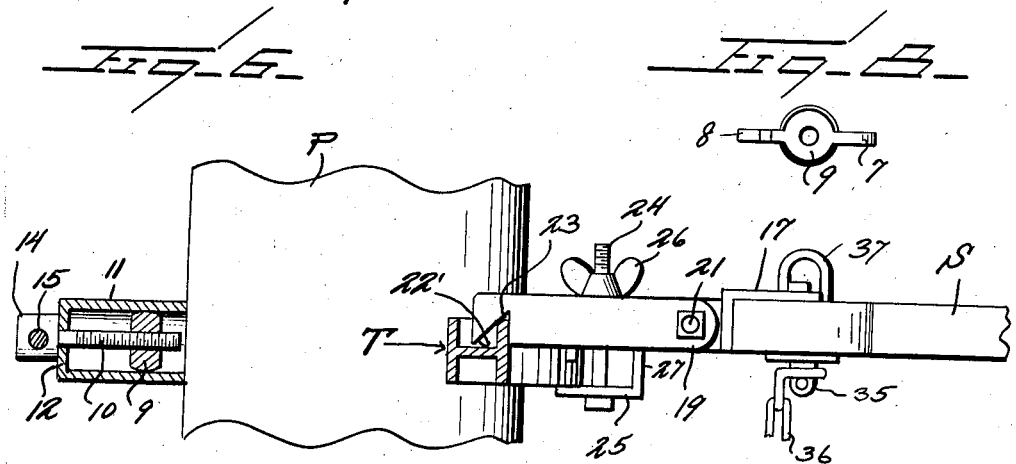
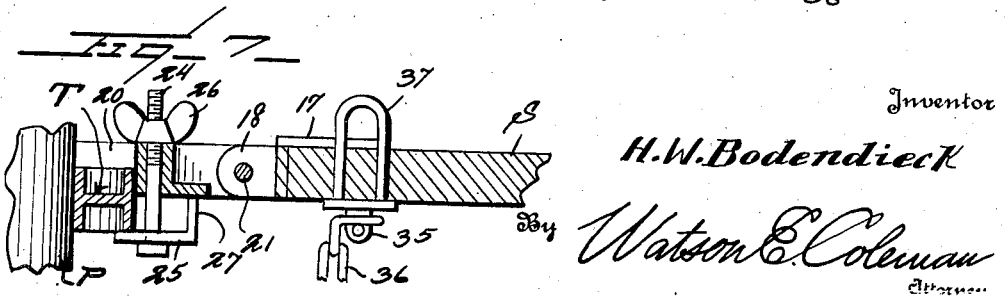
Inventor
H. W. Bodendieck
By Watson E. Coleman
Attorney June 27, 1933.  H. W. BODENDIECK  1,915,715
STAGING FOR LINEMEN
Filed Oct. 15, 1929    4 Sheets-Sheet 3
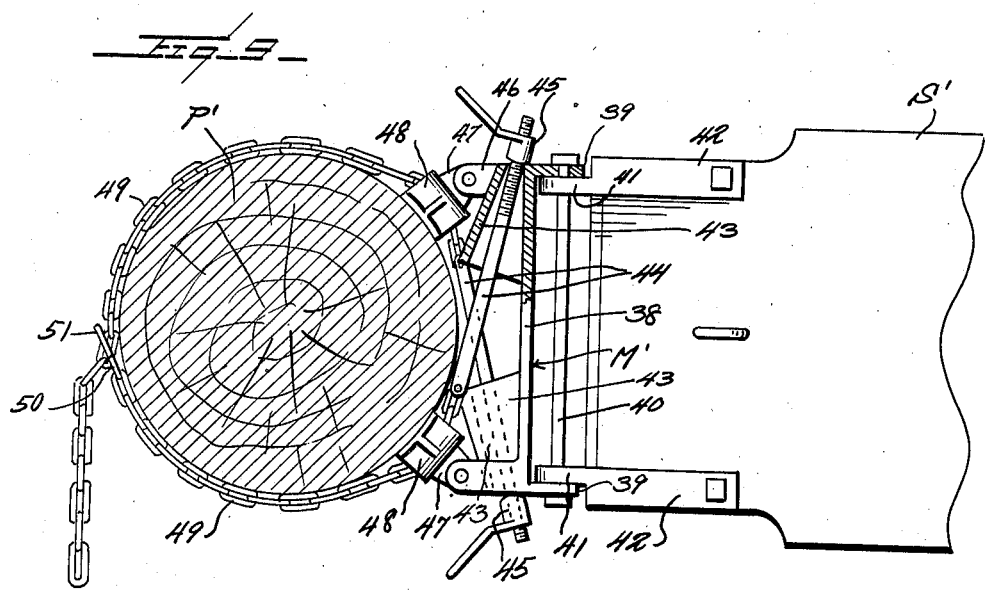
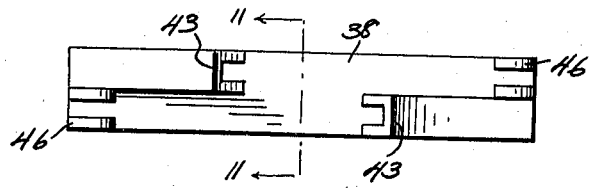
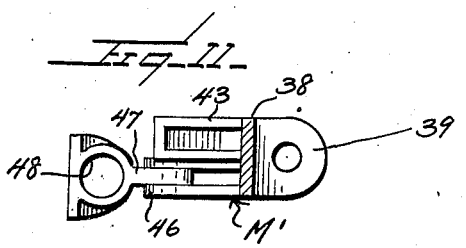
Inventor
H. W. Bodendieck
By Watson E. Coleman
Attorney June 27, 1933.  H. W. BODENDIECK  1,915,715
STAGING FOR LINEMEN
Filed Oct. 15, 1929   4 Sheets-Sheet 4
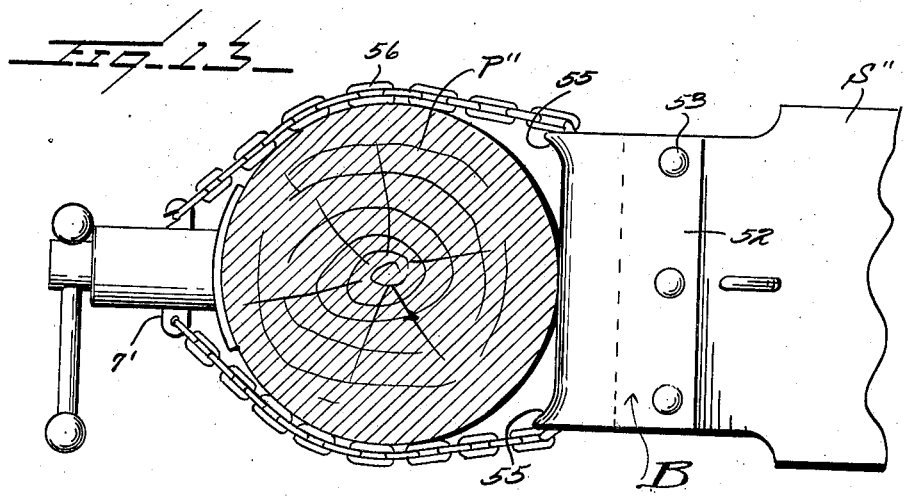
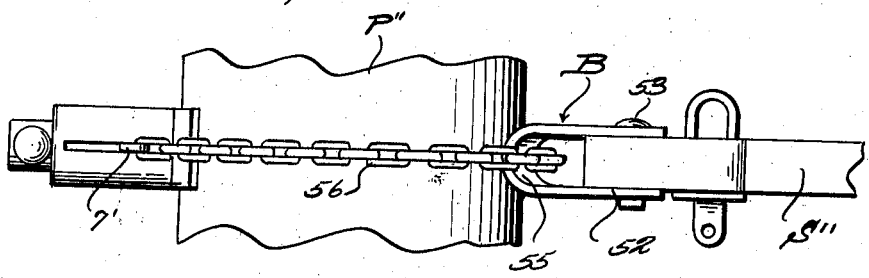
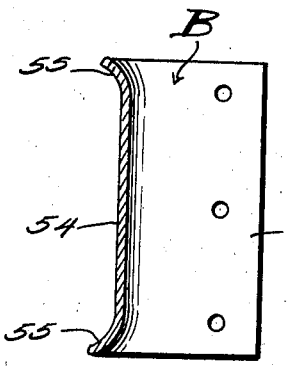
Inventor
H. W. Bodendieck
By Watson E. Coleman
Attorney Patented June 27, 1933

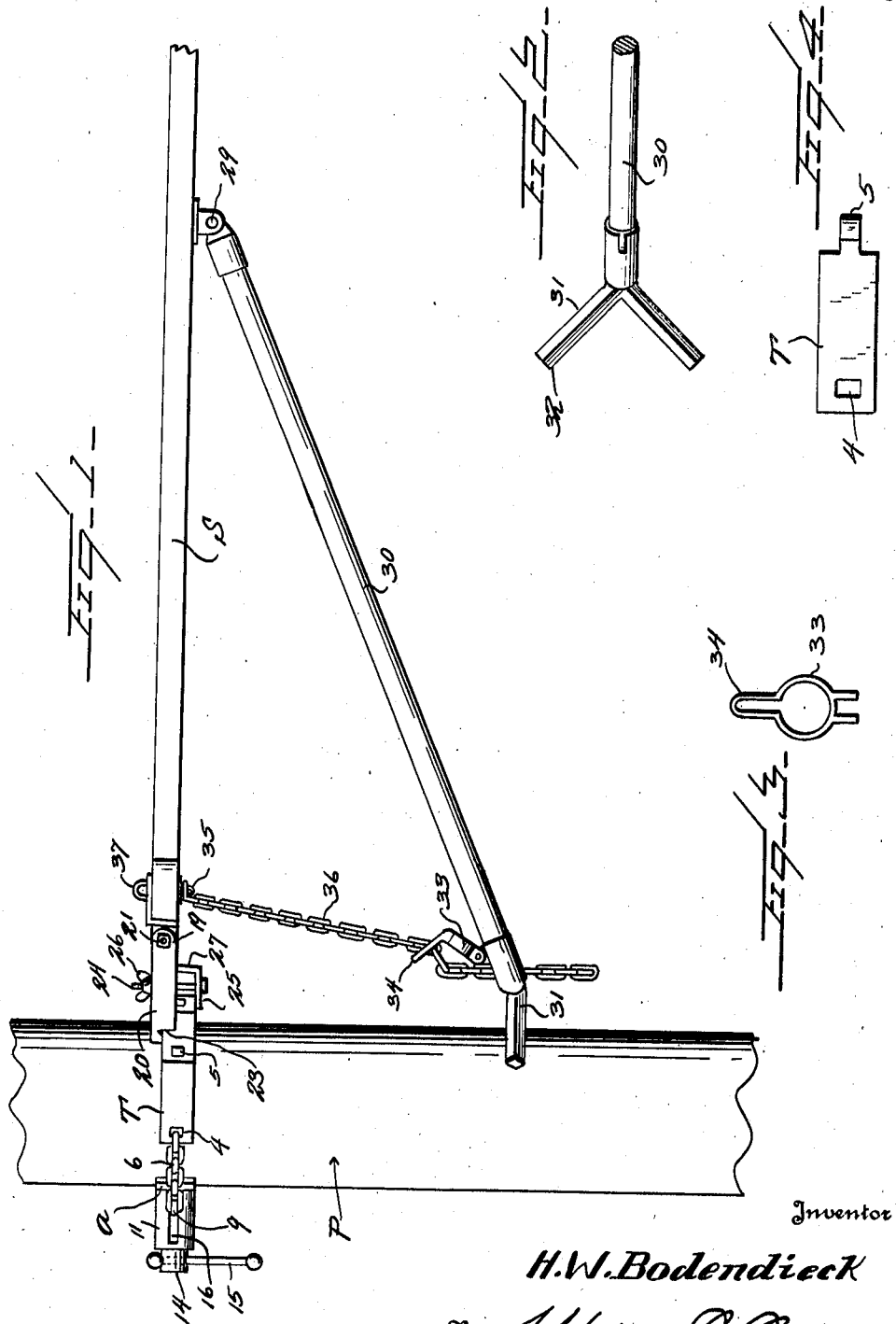

1,915,715

UNITED STATES PATENT OFFICE

HENRY W. BODENDIECK, OF TAYLORVILLE, ILLINOIS, ASSIGNOR TO TIP'S TOOL COMPANY, INC., OF TAYLORVILLE, ILLINOIS, A CORPORATION OF ILLINOIS

STAGING FOR LINEMEN

Application filed October 15, 1929. Serial No. 399,823.

This invention relates to staging for linemen, and it is an object of the invention to provide an apparatus of this kind embodying means whereby the platform may be mounted upon a pole or kindred support in a manner so that the weight imposed upon the platform is imposed downwardly and directly upon said pole or support in a general direction lengthwise of the platform and which is supported in desired working position free of any hindrance or obstruction from above the platform.

Another object of the invention is to provide an apparatus of this kind which can be readily and conveniently supported to selective points around the pole or kindred support with the platform at all times substantially radially disposed with respect to said pole or kindred support to assure maximum of supporting strength.

An additional object of the invention is to provide a device of this kind comprising a member adapted to be anchored to a pole or support together with a platform in hinged connection with said member and wherein said member has associated therewith from below a brace for coaction with the pole or the like for maintaining the platform in desired working position, the hinged connection between the platform and the member permitting the platform to assume a depending position close to the pole or support when raising the apparatus to desired location upon the pole or the like.

The invention consists in the details of construction and in the combination and arrangement of the several parts of my improved staging for linemen whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation illustrating a staging for linemen constructed in accordance with an embodiment of my invention and in applied position;

Figure 2 is a fragmentary view in perspective of the outer end portion of the brace member as comprised in Figure 1;

Figure 3 is a view in elevation of the locking member as disclosed in Figure 1 unapplied;

Figure 4 is an enlarged view in elevation of one of the track sections as comprised in Figure 1;

Figure 5 is a view partly in top plan and partly in section of the structure as illustrated in Figure 1;

Figure 6 is a sectional view taken substantially on the line 6—6 of Figure 5 with certain of the parts in elevation;

Figure 7 is a sectional view taken substantially on the line 7—7 of Figure 5;

Figure 8 is a view in elevation of the cross member of the track tightener as herein embodied;

Figure 9 is a view partly in section and partly in top plan illustrating a staging for linemen constructed in accordance with another embodiment of my invention;

Figure 10 is a view in front elevation of the supporting member as embodied in Figure 9;

Figure 11 is a sectional view taken substantially on the line 11—11 of Figure 10;

Figure 12 is a view in plan of the locking link comprised in one of the chain sections illustrated in Figure 9;

Figure 13 is a view partly in section and partly in top plan illustrating a still further embodiment of my invention;

Figure 14 is a view in side elevation of the structure as illustrated in Figure 13;

Figure 15 is a sectional view taken through the butt member carried by the platform or staging unapplied.

In the embodiment of my invention as illustrated in Figures 1 to 8 inclusive, P denotes a pole or kindred support generally employed in connection with electric, telephone and kindred lines and with which my improved apparatus is adapted to be used.

In this embodiment of my invention I provide a plurality of arcuate track sections T.

Each of these sections in cross section is in the form of an I-beam with the outer flange 1 projecting at opposite ends a desired distance beyond the ends of the interposed web 2. The inner flange 3 is adapted to have direct contact with the periphery of the pole or kindred support as illustrated.

One extended portion of each of the track sections T is provided with a slot or opening 4 while the opposite end portion is provided with an extended hook member 5. The hook member 5 of one section T is adapted to be disposed from within through the opening 4 in an adjacent track section so that the complete track section will be articulated or flexible whereby it may readily compensate itself to poles or the like of varying diameters. While it may be true that in some instances the flanges 3 of the sections T will not have at all points close contact with the periphery of the pole or the like, yet in practice this is not essential.

Operatively engaged with the outer end portions of the flanges 1 of the end sections T are the chains 6 or other suitable flexible members, the opposite end portion of one of said chains being substantially permanently secured to an outer end portion of a cross member 7 while the second chain or flexible member 6 is detachably engaged with the opposite end portion of said cross member 7 and preferably through the instrumentality of a hook 8. The central portion of the cross member 7 is laterally enlarged beyond opposite sides thereof to provide a central head 9 and threading through the central portion of this head 9 is an elongated shank 10. This shank 10 extends within a cylindrical housing 11 through the outer closed end 12 thereof. The shank 10 is freely directed through this closed end 12 and outwardly of said end 12 the shank 10 is provided with a head 14 having direct contact with said end 12. Disposed through the head 14 in a well known manner is an operating bar 15 whereby the shank 10 may be readily rotated as desired to impose requisite pull upon the chains 6, or in a direction to release the strain on said chains when it is desired to remove the track sections.

The housing 11 at diametrically opposed points is provided with the slots 16 extending lengthwise thereof and through which the outer end portions of the cross member 7 are directed. This housing 11 is open at its inner end and said open end is defined by the outstanding flanges $a$ for contact with the pole P or the like.

The free side faces of the head 9 are parti-spherical and of a radius substantially equal to the radius of the bore of the housing 11.

In applying the cross member 7 an end portion thereof is inserted through the inner open end of the housing 11 and projected through either of the slots 16. These slots 16 are of sufficient length to permit the cross member 7 to be moved in a general direction lengthwise of the housing 11 until the opposite end portion of the cross member 7 is also within the housing 11. At this time the cross member is then swung in a direction to project said opposite end portion out through the second slot 16.

The parti-spherical formation of the side faces of the head 9 assures and facilitates this application of the cross member 7 into working position and, of course, its removal.

The platform or staging S is of any desired dimensions and secured to the opposite side portions of the inner extremity of the staging S are the castings 17 having lugs 18 extending beyond the inner end of the staging S. Lapping the lugs 18 are lugs 19, herein disclosed as constituting end portions of the side arms 20 of a holding member M. Disposed through the lapping lugs 18 and 19, and as herein disclosed common to both sets, is a pivot bolt or member 21 so that the staging S, or platform as it may be called, and the holding member M are connected for relative swinging movement.

The side arms 20 of the holding member M are connected by an intermediate cross bar 22, said bar 22 and arms 20 preferably constituting a single casting. The side members or arms 20 are of a desired length and the outer portion of each is undercut to provide a notch 23 so that the arm 20 may be readily engaged from above with an outer flange of a track section T. As illustrated in Figure 6, it is to be noted that the outer side wall 22' of the notch or recess 23 is disposed on an outward and downward incline. This is of importance in order to readily compensate for variance in thicknesses of a flange 1 and also to compensate for the varying arrangements of the track sections T as occasioned by poles P or the like of differing diameters.

The central portion of the cross bar 22 has freely disposed therethrough a shank 24 which is also inserted from below through an intermediate portion of a clamping arm 25, one end portion of which engaging the flange 1 of a track section T from below. The portion of the shank 24 above the bar 22 has threaded thereon a wing nut 26 for conventional coaction with the bar 22 to bring the arm 25 and the arms 20 in tightly clamped engagement with certain of the track sections T whereby the member M is effectively anchored in desired selective position upon the trackway or guide afforded by the assembled sections T.

The outer or opposite end of the clamping arm 25 is provided with an angularly disposed heel 27 extending upwardly for contact with a rearwardly disposed plate 28 carried by the central portion of the bar 22. The plate 28 extends below the pivot bolt 21 and terminates inwardly of the adjacent end of the staging or platform S so that said plate 28 will offer no hindrance or obstruction to the relative swinging movement between the staging or platform S and the member M.

This contact of the heel 27 with the plate 28 prevents tilting of the member M during a clamping operation or, in other words, assures the member M when clamped to be arranged in desired position with respect to the trackway.

The outer portion of the staging or platform S has pivotally connected, as at 29, to its under surface an elongated brace bar 30. The opposite end portion of this bar 30 carries a fork, the fingers 31 of which converging towards the bar 30. These fingers are coplanar and are disposed on a desired angle with respect to the longitudinal axis of the bar 30. Each of the fingers 31 is of such cross sectional configuration to provide substantially a knife edge 32 for direct contact with the periphery of a pole P or the like to assure effective contact of the fingers 31 with such pole and more particularly to reduce the liability of slippage.

The fingers 31 when the device is in applied position are disposed generally in directions transversely of the platform or staging S and while the knife edges 32 of these fingers 31 will prevent slippage lengthwise of the pole P and more particularly downward slippage, the fingers will allow the staging or platform S to be swung laterally around the pole especially when the staging or platform is under load. The fingers 31, as the staging or platform S is moved laterally, permit the brace bar 30 to be correspondingly shifted to maintain the desired bracing efficiency.

It is to be understood that the fingers 31 will be engaged with the pole P at a desired point below the applied trackway to assure the staging or platform S to be supported in substantially a horizontal position. The spacing between the applied fingers 31 and trackway will depend upon the angle of the pole P with respect to the horizontal. As such longitudinal axis of the pole leans to either side of the vertical, the points of contact of the fingers 31 will have to be correspondingly raised or lowered to assure the desired horizontal arrangement of the staging or platform S.

The outer end portion of the bar 30, or at a point immediately adjacent to the fork, carries a pivotally mounted locking member or link 33 having an upstanding restricted portion 34. Suitably anchored, as at 35, to the under surface of the staging or platform S closely adjacent to its pivotal connection with the member M is secured an end portion of a chain 36.

This chain 36 is of such length as to have its opposite or free end portion readily insertible through the locking member or link 33 as the bar 30 is adjusted with respect to the staging or platform S in applying the apparatus in working position. When the desired adjustment of the bar 30 has been effected, a link of the chain 36 is engaged within the restricted portion 34 of the member or link 33 whereby an effective connection is had between the chain 36 and the bar 30, thus permitting the chain 36 to effectively hold the bar 30 against swinging movement in a direction away from the staging or platform S.

The inner or pivoted end portion of the staging or platform S carries on its upper or working face an outstanding eye member 37 with which is adapted to be engaged a hand line whereby the apparatus may be readily raised or lowered with respect to the pole. This hand line, of course, will coact with a suitable guide pulley or the like supported by a cross arm or other location a desired distance above the desired point of mounting for the track sections T. It is also to be understood that in raising or lowering the apparatus the chain 36 is free of the bar 30 so that the staging or platform S together with the bar 30 will be in a lowered or dropped position closely adjacent to the pole P. After the staging or platform S has been properly engaged with the trackway the bar 30 may be used for properly elevating or raising the outer portion of the staging or platform S into desired working position whereupon the fingers 31 are brought into proper engagement with the pole P and the chain 36 brought into desired locking engagement with the member or link 33.

In practice should it be necessary to adjust the position of the staging or platform S around the pole P, it is not necessary to remove the apparatus but only to loosen the arm 25 sufficiently to permit the holding member M to be moved upon the trackway to bring the staging or platform S into the position desired whereupon the arm 25 is then brought into clamping action. As clearly illustrated in the drawings, it is to be noted that the assembled track sections T are such to readily permit the desired movement of the holding member M upon the trackway.

It is also to be stated that the number of track sections T employed will vary in accordance with the necessities of practice. It being of advantage, however, in every instance to employ a sufficient number of sections to extend substantially two-thirds the way around the pole. In view of the construction of each of the track sections T it is believed to be evident that the sections may be applied or removed as required.

In the embodiment of my invention as illustrated in Figures 9 to 12 inclusive, the holding member M' comprises an elongated member or plate 38 provided at its extremities with the outwardly disposed lugs 39 pivotally connected by the bolt 40 to the lugs 41 extending beyond the inner or rear end of the staging or platform S'. These lugs 41 constitute a part of the castings 42 suitably secured to the rear side portions of the staging or platform S'.

The rear face of the member or plate 38 adjacent its opposite ends and at opposite sides of its transverse center has formed therewith the boxes 43. These boxes 43 are each open at its opposite ends and the bore thereof is gradually reduced laterally from its inner end towards its outer end. Disposed through each of the boxes 43 is an elongated shank 44 and threaded upon the outer end portion of said shank 44 is a speed nut 45 or the like, said nut having direct contact with the adjacent or restricted end of the box. By having the bore or interior of the box 43 gradually reduced laterally from its inner end towards its outer end the shank 44 will readily adjust itself as the occasions of practice may require and as will be hereinafter referred to. By having the boxes 43 arranged at opposite sides of the transverse center of the member or plate 38 the inner end portions of the shanks 44 disposed through said boxes are permitted to readily cross each other as illustrated in Figure 9 so that one of said shanks 44 will in no way interfere with the other.

The opposite end portion of the member or plate 38 above the outer end portion of one of the boxes 43 and below the outer end portion of the second box is provided with the rearwardly disposed ears 46, said ears being arranged in pairs with the ears of each pair spaced apart in a direction transversely of the member or plate 38.

Pivotally engaged between each pair of ears 46 is a lug 47 extending outwardly from an arcuate tubular member 48, said member 48 being adapted to have close contact with the periphery of a pole P' or kindred support.

Suitably anchored to the outer end portion of each of the shanks 44 is a flexible member or chain 49 of desired length and the member or chain 49 secured to each of the shanks 44 is freely disposed through the tubular member 48 remote from the box 43 through which said shank 44 is directed. The members or chains 49 are adapted to be disposed around the pole or kindred support P' and the outer or free end portion of one of the members or chains 49 is insertible through a locking link 50 at the outer end of the second flexible member or chain 49. This locking link 50 has a restricted portion 51 in which is adapted to be received a link of the second chain whereby the chains 49 may be initially tightly engaged around the pole P' with the members 48 in contact with the pole. After this initial mounting the nuts 45 are operated to cause the shanks 44 to impose pull upon the chains 49 to effect tight contact of the members 48 with the pole P' to assure an effective anchorage of the member M' in desired position upon the pole.

The staging or platform S' has associated therewith a bracing bar similar to that shown in the first embodiment of my invention and the apparatus as a whole is applied or removed from working position in the same manner as hereinbefore set forth with respect to this other structure. In this second embodiment of my invention, however, the desired shifting of the apparatus can be readily accomplished by loosening the chain as by retrograde turning of the nuts 45 and thereby permitting the staging or platform S' to be shifted around the pole P' or the like to bring said staging or platform S' into desired selective position.

In the embodiment of the invention as illustrated in Figures 13 to 15 inclusive, the staging or platform S" at its rear or inner end has secured thereto a butt member B, said member in cross section being substantially in the form of a U. The adjacent end portion of the staging or platform S" extends between the side members 52 of the butt member B and is secured thereto by the bolts 53 or otherwise as may be preferred. The end of the staging or platform S" inserted between the side members 52 terminates in spaced relation to the outer or base plate 54 of the member B. It is to be understood that the side members 52 and the base plate 54 constitute a single casting.

The outer face of the base plate 54 is substantially straight from end to end in order to provide effective contact with the periphery of a pole P" or kindred support. The extremities of the base plate 54, however, are provided with outwardly flared extensions 55.

A chain 56 or the like is inserted inwardly of the base plate 54 between the side members 52 and said chain has close contact with the inner face of said base plate 54. The outwardly flared portions 55 are of advantage as the adjustment of the butt member B along the chain is facilitated and said flared portions 55 as the chain 56 is tightly engaged with the pole P" or the like materially facilitate such engagement. The extremities of the chain 56 are engaged with the opposite end portions of a cross member 7'. This cross member 7' is comprised in a chain tightening structure similar to that described and illustrated in connection with the first embodiment of my invention as herein disclosed and, therefore, it is not believed that a further detailed description of the tightener is necessary.

It is also to be understood that the staging or platform S″ has associated therewith a bracing bar similar to the bar as particularly described in connection with the first embodiment of my invention as herein set forth.

In this last embodiment of my invention it is believed to be obvious that the coaction of the chain 56 with the butt member B is such to permit the staging or platform S″ to have pivotal movement with respect to such chain and that the staging or platform S″ may be readily adjusted around the pole P″ to any desired selective position.

It is to be understood that in referring hereinbefore to the platform or staging S I have in mind any elongated member of advantageous use in connection with the maintenance of elevated lines and kindred work.

From the foregoing description it is thought to be obvious that a staging for linemen constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An apparatus of the class described comprising a platform, means for pivotally connecting said platform to a pole or kindred support, a brace bar pivotally engaged at one extermity with the outer portion of the platform, and means carried by the opposite end portion of the brace bar for contact with the pole or kindred support to hold said end portion of the brace bar against slippage along the support, said last named means allowing the brace bar to be bodily shifted laterally while in contact with the pole or kindred support.

2. An apparatus of the class described comprising a platform, means for pivotally connecting said platform to a pole or kindred support, a brace bar pivotally engaged at one extremity with the outer portion of the platform, and means carried by the opposite end portion of the brace bar for contact with the pole or kindred support to hold said end portion of the brace bar against slippage along the support, said last named means allowing the brace bar to be bodily shifted laterally while in contact with the pole or kindred support, and coacting means carried by the platform and the brace bar for limiting the extent of separating movement of the bar in a direction away from the platform.

3. An apparatus of the class described comprising a platform, means for pivotally connecting said platform to a pole or kindred support, a brace bar pivotally engaged at one extremity with the outer portion of the platform, diverging arms carried by the opposite extremity of the brace bar and laterally disposed with respect to the platform, said arms being adapted for engagement with the pole or kindred support, said arms being provided with knife edges extending therealong for direct engagement with the pole or kindred support, said contact of the knife edges holding the brace bar against slippage lengthwise of the pole or kindred support and permitting the platform to be swung around the pole or kindred support.

4. An apparatus of the class described comprising an articulated trackway, means for securing said trackway around a support, a member adapted to be supported by the trackway and shiftable therealong, a platform pivotally engaged with the member, and a bracing member coacting with the platform and the support for holding the platform raised.

5. An apparatus of the class described comprising an articulated trackway, means for securing said trackway around a support, a member adapted to be supported by the trackway and shiftable therealong, a platform pivotally engaged with the member, and a bracing member coacting with the platform and the support for holding the platform raised, said bracing member having means engageable with the support allowing the bracing member to shift around the support as the first named member and platform are shifted along the trackway without disengaging the bracing member from either the support or platform.

6. An apparatus of the class described comprising a trackway, means for securing said trackway around a support, a member having spaced arms, means for selectively holding said arms of the member to the trackway and against shifting movement along the trackway, a platform pivotally engaged with said member, and a bracing member coacting with the platform and support for holding the platform raised.

7. An apparatus of the class described comprising a member, tubular members pivotally connected with the first named member at transversely spaced points, said tubular members being adapted for contact with a support, flexible means insertible through each of the tubular members and extending around the support for holding the first named member and tubular members to the support, a platform pivotally connected with the first named member, and a bracing means coacting with the platform and the support for holding the platform raised.

8. An apparatus of the class described comprising a member, a platform pivotally connected to said member, spaced tubular members pivotally connected to the first member and adapted for contact with a support, shanks carried by the first member and disposed in crossed relation, a flexible member carried by each of said shanks and passing through one of the tubular members, the flexible members being adapted to be secured around the support to hold the tubular members and the first named member thereto, means coacting with each of the shanks and the first member for placing the flexible members in tight engagement with the support, and a bracing means for the platform.

9. An apparatus of the class described comprising an elongated member, means for pivotally connecting an end portion of the member with a support, said means permitting lateral adjustment of the member during the period said means is engaged with the support, and a bracing means coacting with the member and the support for maintaining the member in extended working position, said bracing means being also laterally movable from one position to another while in working engagement with the support.

10. An apparatus of the class described comprising an elongated member, means for pivotally connecting an end portion of the member with a support to allow the member to have swinging movement toward or from the support, said means also allowing the member to be bodily shifted laterally with respect to the support without removing said means from the support, and a bracing means coacting with the member and the support for maintaining the member in extended working position, the engagement of the bracing means with the support permitting said bracing means to be bodily shifted laterally during the period said bracing means is operative and the member is under load.

11. An apparatus of the class described comprising a platform, an attaching member disposed through an end portion of the platform, said end of the platform being adapted to butt a support, said attaching means extending along opposite sides of the support, means for coaction with the extremities of the attaching member and the support for holding the butt end of the platform in effective contact with the support, and a bracing means for the platform.

12. An apparatus of the class described comprising a platform, a butt member secured to one end portion of the platform for contact with a support, a flexible member insertible through the butt member, means coacting with the opposite end portions of the flexible member and the support for holding the butt member in effective contact with the support, and a bracing means for the platform.

13. An apparatus of the class described comprising a platform, a butt member secured to one end portion of the platform for contact with a support, a flexible member insertible through the butt member, means coacting with the opposite end portions of the flexible member and the support for holding the butt member in effective contact with the support, and a bracing means for the platform, the contacting portion of the butt member being straight.

14. An apparatus of the class described comprising a platform, a butt member secured to one end portion of the platform for contact with a support, a flexible member insertible through the butt member, means coacting with the opposite end portions of the flexible member and the support for holding the butt member in effective contact with the support, and a bracing means for the platform, the contacting portion of the butt member being straight, the extremities of said straight portion terminating in outwardly flared extensions.

In testimony whereof I hereunto affix my signature.

HENRY W. BODENDIECK.